July 24, 1928.

L. B. ANDRESEN

BEARING FOR ANGLE ATTACHMENTS FOR DENTAL HANDPIECES

Filed March 26, 1925

1,678,097

INVENTOR
LAURITZ B. ANDRESEN
BY *[signature]*
ATTORNEYS

Patented July 24, 1928.

1,678,097

UNITED STATES PATENT OFFICE.

LAURITZ B. ANDRESEN, OF MINNEAPOLIS, MINNESOTA, ASSIGNOR TO M. F. PATTERSON DENTAL SUPPLY CO., OF ST. PAUL, MINNESOTA, A CORPORATION OF ILLINOIS.

BEARING FOR ANGLE ATTACHMENTS FOR DENTAL HANDPIECES.

Application filed March 26, 1925. Serial No. 18,493.

This invention relates to improvements in bearings for angle attachments or heads for dental hand pieces and more particularly to the bearings thereof which support the burr tube in which the tool or burr is mounted when the head is in operation.

An object of the invention is to provide an angle head having improved bearings therein for supporting the usual burr tube which will positively prevent any dust or grit from entering the bearing when the instrument is in use.

A further object of the invention is to provide such an angle head having means mounted upon the burr tube thereof for the purpose of outwardly directing away from the bearings thereof, such foreign material as grit and saliva, thereby preventing such material from entering the bearings and thereby causing damage thereto.

A further object is to provide such a device of simple and inexpensive construction which may readily and conveniently be taken apart for cleaning and repairs and may as readily be re-assembled.

Other objects of the invention will appear from the following description and the accompanying drawings and will be pointed out in the annexed claims.

In the drawings, there has been disclosed a structure designed to carry out the various objects of the invention but it is to be understood that the invention is not confined to the exact features shown as various changes may be made within the scope of the claims which follow.

Figure 1:
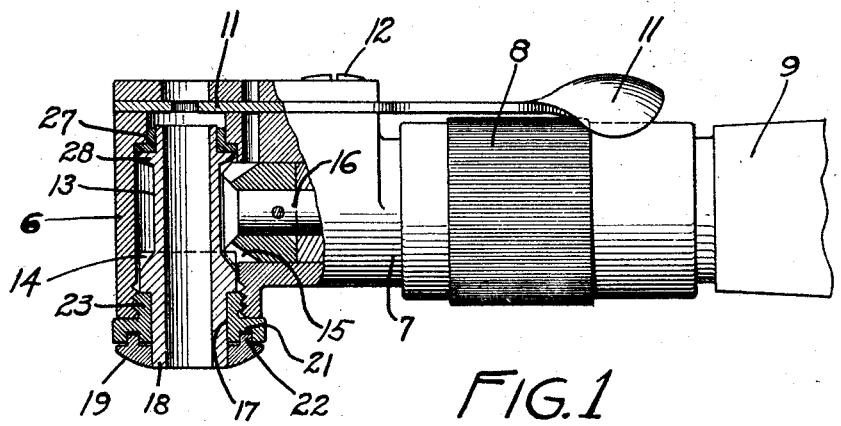
Figure 1 is a partial sectional view of an angle head showing the novel dust and grit-proof bearing mounted therein.

In the selected embodiment of the invention here shown there is illustrated an angle head similar to the one featured in my prior pending application Serial No. 18,492 filed March 16, 1925. This angle head comprises the usual head 6 having a cylindrical end-portion 7 formed thereon which is received in threaded engagement in a coupling sleeve 8 having its other end received in threaded engagement upon one end of a supporting member 9 of ordinary construction. The coupling sleeve 8 is provided with right and left handed threads so that when it is rotated in one direction the head will be released or unlocked and when rotated in the opposite direction, it will be securely locked to the supporting member 9 in its adjusted position. The usual latch 11 is also shown pivotally mounted upon a stud 12 secured to the head 6. This latch functions to retain the tool or burr in the head when the instrument is being used.

Figure 2:
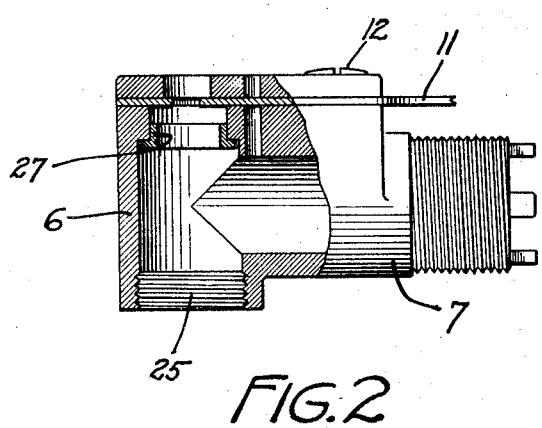
Figure 2 is a view of the head removed from its supporting means and also showing the lower bearings and burr tube removed from the head.
Figure 4:
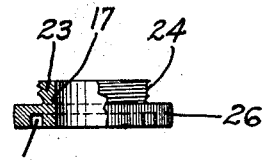
Figure 4 is a partial sectional view of the lower bearing removed from the burr tube.
Figure 3:
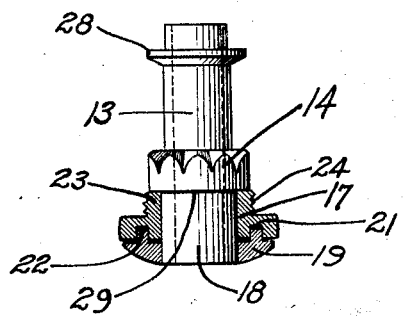
Figure 3 is a view showing the burr tube removed from the head and also showing in section the lower supporting bearing mounted thereon.
Figure 5:
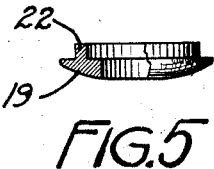
Figure 5 is a similar view showing the dust cap removed from the burr tube and bearing.

An important feature of this invention resides in the novel construction of the lower bearing for the burr tube 13 rotatably mounted in the head 6. The burr tube 13 is provided with the usual beveled pinion 14 adapted to mesh with a pinion 15 mounted upon a shaft 16 which is mounted in suitable bearings, not shown. As shown in Figure 3, the lower bearing 17 is preferably mounted upon the lower end-portion 18 of the burr tube 13, and is retained thereon by means of a dust cap 19 which is preferably fixedly mounted upon the lower end-portion 18 of the tube by such means as being pressed thereon. The bearing 17 is provided with an annular groove 21 adapted to receive a correspondingly shaped tongue 22 provided on the dust cap 19. This tongue and groove arrangement functions to prevent dust and grit from creeping into the bearing when the tool is in use. The upper end-portion 23 of the bearing 17 is preferably provided with threads 24 adapted to be received in similar threads 25 provided in the bore of the head 6 as shown in Figure 2. The bearing 17 is also preferably knurled as shown at 26 in Figure 4, so that it may readily be secured to the threads 25 in the head.

A bearing 27 is mounted in the upper portion of the head 6 to support the upper end of the burr tube 13. By reference to Figures 1 and 3, it will be noted that the upper end of the burr tube is preferably turned down so as to be received in the upper bearing 27 as shown in Figure 1. A flange 28 is also provided on the burr tube to take up the end thrust of the tube when in use.

In assembling the angle head, the bearing 17 will first be mounted upon the lower end-portion of the burr tube with its upper end or face abutting the shoulders 29 provided by the lower portion of the pinion or gear 14. The dust cap 19 will then be pressed onto the end-portion 18 of the tube until it substantially contacts with the lower face of the bearing 17, sufficient clearance between the two, however, being allowed so as to provide a free running fit for the shoulder 29 and the upper face of the dust cap 19. The burr tube with the bearing 17 and dust cap 19 assembled thereon, will then be inserted into the head 6 and the bearing 17 secured thereto by means of the threads 24 and 25, it being understood of course that the upper reduced end-portion of the tube 13 will enter the upper bearing 27 as shown in Figure 1. When the head has thus been assembled, it will be impossible for any dust or grit to enter or work into the lower bearing when the burr tube is being rotated. This will readily be seen and understood as a result of the dust cap 19 being fixedly mounted upon the lower end of the burr tube, thereby preventing any foreign matter from entering between the dust cap and the burr tube, and also as a result of the tongue and groove arrangement between the cap and the bearing, which will further prevent any foreign material from entering between the lower face of the bearing and the upper face of the dust cap.

By the employment of this novel bearing construction or method of supporting the burr tube within the angle head, it will be impossible for any dust or grit to work into the bearing and cause damage thereto. This is accomplished by means of the tongue 22 of the cap 19 fitting into and rotating in the annular groove 21 in the lower bearing 17, and also as a result of the centrifugal action of the cap 19 which action tends to outwardly direct away from the bearing all saliva and grit coming in contact therewith. By thus preventing dust and grit from entering the lower bearing, the life of the instrument will be greatly prolonged as compared with similar instruments, of ordinary construction, which are provided with other types of bearings and must therefore have frequent bearing replacement or repairs as a result of saliva and grit working into the bearings and causing damage thereto.

Having thus described my invention what I claim as new and desire to secure by Letters-Patent, is:

1. A dental tool head, a burr tube having bearings in said head, one of said bearings having an annular groove, and means mounted on said tube and rotatable in said groove, and cooperating therewith to exclude foreign material from said bearing.

2. A dental tool head in combination with a burr tube having bearings therein, a member mounted on said tube and having means interlocking with one of said bearings to form a tortuous passage between them to prevent the entrance of dust and grit into said bearing.

3. The combination with a dental tool head, of a burr tube mounted for rotation therein, and having a bearing adjacent its tool-receiving end, said bearing having an annular groove therein, and said tube having a member provided with an annular rib to enter said groove and rotate therein, the revolution of said tube and member operating to direct foreign material outwardly from the passage between said member and bearing.

4. A dental tool head having a cylindrical recess therein, a burr-holder adapted rotatably to be received within the recess, a bearing for the burr-holder demountably secured to the head and extending within the recess and adapted demountably to retain the burr-holder in its operable position, and a tongue-and-groove device encircling the tool-end of the burr-holder to prevent entrance of foreign material to the bearing.

5. A dental tool head having a bearing therein, a burr tube rotatably mounted in the bearing, a circular member terminally secured to the tube exteriorly of the head and in close proximity with the bearing, an annular groove in the face of said bearing, and an annular tongue on said circular member engaging said groove to prevent foreign material from entering the bearing.

In witness whereof, I have hereunto set my hand this 21st day of March, 1925.

LAURITZ B. ANDRESEN.